(12) United States Patent
Alkhatib

(10) Patent No.: US 6,430,623 B1
(45) Date of Patent: Aug. 6, 2002

(54) DOMAIN NAME ROUTING

(75) Inventor: Hasan S. Alkhatib, Saratoga, CA (US)

(73) Assignee: IP Dynamics, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/492,565

(22) Filed: Jan. 27, 2000

Related U.S. Application Data

(63) Continuation of application No. 09/015,840, filed on Jan. 29, 1998, now Pat. No. 6,119,171.

(51) Int. Cl.⁷ .............................................. G06F 15/16
(52) U.S. Cl. ...................... 709/245; 709/202; 709/238; 709/249; 709/250; 370/390; 370/392; 370/397; 370/409
(58) Field of Search ................................. 709/201–203, 709/217–219, 220, 225, 227–228, 238–239, 245, 244–250; 713/200–201; 370/389–390, 392–343, 396–397, 400–401, 405–409

(56) References Cited

U.S. PATENT DOCUMENTS

| | | | |
|---|---|---|---|
| 5,361,256 A | 11/1994 | Doeringer et al. | 370/390 |
| 5,623,605 A | 4/1997 | Keshav et al. | 395/200.66 |
| 5,717,687 A | 2/1998 | Minot et al. | 370/396 |
| 5,751,961 A | 5/1998 | Smyk | 395/200.47 |
| 5,764,906 A * | 6/1998 | Edelstein et al. | 709/219 |
| 5,777,989 A | 7/1998 | McGarvey | 709/249 |
| 5,781,550 A | 7/1998 | Templin et al. | 370/401 |
| 5,790,548 A | 8/1998 | Sistainizadeh et al. | 370/401 |
| 5,793,763 A * | 8/1998 | Mayes et al. | 713/201 |
| 5,805,818 A | 9/1998 | Perlman et al. | 395/200.54 |
| 5,805,820 A | 9/1998 | Bellovin et al. | 395/200.55 |
| 5,815,664 A * | 9/1998 | Asano | 709/227 |
| 5,856,974 A | 1/1999 | Gervais et al. | 370/392 |
| 5,867,667 A | 2/1999 | Butman et al. | 709/249 |
| 5,884,246 A | 3/1999 | Boucher et al. | 709/206 |
| 5,889,953 A | 3/1999 | Thebaut et al. | 709/221 |
| 5,913,210 A | 6/1999 | Call | 707/4 |
| 5,937,162 A | 8/1999 | Funk et al. | 709/206 |
| 5,937,163 A | 8/1999 | Lee et al. | 707/102 |
| 6,003,084 A | 12/1999 | Green et al. | 709/227 |
| 6,032,196 A * | 2/2000 | Monier | 709/245 |
| 6,047,325 A * | 4/2000 | Jain et al. | 709/227 |
| 6,055,575 A * | 4/2000 | Paulsen et al. | 709/245 |
| 6,061,738 A * | 5/2000 | Osaku et al. | 709/245 |
| 6,119,171 A * | 9/2000 | Alkhatib | 709/245 |

OTHER PUBLICATIONS

Excerpts from the Help section of Microsoft Outlook pertaining to rules and forwarding email. Microsoft Corporation. *1 (No Date).
Computer Networks, Third Edition, by Andrew S. Tanenbaum, 1996, pp. 643–670, 685–691. *1.
Inside AppleTalk®, Second Edition, by G. Sidhu, R. Andrews, A. Oppenheimer, 1990.*1.
RFC 1631, The IP Network Address Translator (NAT), K. Egevang and P. Francis, May 1994.*1.

* cited by examiner

Primary Examiner—Bharat Barot
(74) Attorney, Agent, or Firm—Vierra Magen Marcus Harmon & DeNiro LLP

(57) ABSTRACT

The present invention provides for a Domain Name Router (DNR) that uses domain names to route data sent to a destination on a network (e.g., a stub network). Each corporate entity or stub network can be assigned one or a small number of global addresses. Each of the hosts on the stub network can be assigned a local address. When a source entity sends data to a destination entity with a local address, the data is sent to the DNR using a global address. The source entity embeds the destination's domain name and its own domain name inside the data. The DNR extracts the destination's domain name from the data, translates that domain name to a local address and sends the data to the destination.

47 Claims, 11 Drawing Sheets

DOMAIN NAME ROUTING

This application is a continuation of Ser. No. 09/015,840, filed Jan. 29, 1998, now U.S. Pat. No. 6,119,171.

BACKGROUND OF THE INVENTION

1. Field of the Invention

The present invention is directed to a system for using Internet domain names to route data sent to a destination on a network.

2. Description of the Related Art

Most machines on the Internet use TCP/IP (Transmission Control Protocol/Internet Protocol) to send data to other machines on the Internet. To transmit data from a source to a destination, the Internet Protocol (IP) uses an IP address. An IP address is four bytes long, which consists of a network number and a host number.

There are at least three different classes of networks currently in use: Class A, Class B and Class C. Each class has a different format for the combination of the network number and the host number in the IP addresses. A Class A address includes one byte to specify the network and three bytes to specify the host. The first bit of a Class A address is a 0 to indicate Class A. A Class B address uses two bytes for the network address and two bytes for the host address. The first two bits of the Class B address are 10 to indicate Class B. The Class C address includes three bytes to specify the network and one byte for the host address. The first three bits of the Class C network address are 110 to indicate Class C. The formats described above allow for 126 Class A networks with 16 million hosts each; 16,382 Class B networks with up to 64K hosts each; and 4 million Class C networks with up to 256 hosts each.

When written out, IP addresses are specified as four numbers separated by dots (e.g. 198.68.70.1). Users and software applications rarely refer to hosts, mailboxes or other resources by their numerical IP address. Instead of using numbers, they use ASCII strings called domain names. A domain name is usually in the form of prefix.name_of_organization.top_level_domain. There are two types of top level domains: generic and countries. The generic domains are corn (commercial), edu (educational institutions), gov (the U.S. Federal Government), int (international organizations), mil (the U.S. Armed Forces), net (network providers), and org (non-profit-organizations). The country domains include one entry for each country. An example of a domain name is saturn.ttc.com. The term "saturn" is the prefix and may refer to a particular host in the network. The phrase "ttc" is the name of the organization and can be used to identify one or more networks to the outside world. The phrase "com" signifies that this address is in the commercial domain. The Internet uses a Domain Name System to convert the domain name to an IP address.

The Internet Protocol has been in use for over two decades. It has worked extremely well, as demonstrated by the exponential growth of the Internet. Unfortunately, the Internet is rapidly becoming a victim of its own popularity: it is running out of addresses. Over 4 billion addresses exist, but the practice of organizing the address space into classes wastes millions of addresses. In particular, the problem is the Class B network. For most organizations, a Class A network, with 16 million addresses is too big, and a Class C network with 256 addresses is too small. A Class B network appears to be the right solution for most companies. In reality, however, a Class B address is far too Large for most organizations. Many Class B networks have fewer than 50 hosts. A Class C network would have done the job, but many organizations that ask for Class B networks thought that one day they would outgrow the 8 bit host field.

One proposed solution to the depleting address problem is Classless Inter Domain Routing (CIDR). The basic idea behind CIDR is to allocate the remaining Class C networks in varied sized blocks. If a site needs 2,000 addresses, it is given a block of contiguous Class C networks, and not a full Class B network address. In addition to using blocks of contiguous Class C networks as units, the allocation rules for Class C addresses are also changed by partitioning the world into four zones. Each zone includes a predefined number of Class C networks. Although CIDR may buy a few more years time, IP addresses will still run out in the foreseeable future.

Another proposed solution is Network Address Translation (NAT). This concept includes predefining a number of Class C network addresses to be or local addresses (also called private addresses). The remainder of the addresses are considered global addresses. Global addresses are unique addresses. That is, no two entities on the Internet will have the same global address. Local addresses are not unique and can be used by more than one organization or network. However, a local address cannot be used on the Internet. Local addresses can only be used within a private network. NAT assumes that less all of the machines on a private network will not need to access the Internet at all times. Therefore, there is no need for each machine to have a global address. A company can function with a small number of global addresses assigned to one or more gateway computers. The remainder of the machines on the private network will be assigned local addresses. When a particular machine on the private network using a local address attempts to initiate a communication to a machine outside of the private network (e.g. via the Internet), the gateway machine will intercept the communication, change the source machine's local address to a global address and set up a table for translation between global addresses and local addresses. The table can contain the destination address, port numbers, sequencing information, byte counts and internal flags for each connection associated with a host address. Inbound packets are compared against entries in the table and permitted through the gateway only if an appropriate connection exists to validate their passage. One problem with the NAT approach is that it only works for communication initiated by a host within the network to a host on the Internet which has a global IP address. The NAT approach specifically will not work if the communication is initiated by a host outside of the private network and is directed to a host with a local address on the private network.

Another solution that has been proposed is a new version of the Internet Protocol called IPv6 (Internet Protocol version 6, also known as IPng). IPv6 is not compatible with the existing Internet Protocol (IPv4). For example, IPv6 has a longer address than IPv4. Additionally, the IPv6 header is different than the IPv4 header. Because IPv6 is not compatible with IPv4, almost all routing equipment on the Internet must be replaced with updated equipment that is compatible with IPv6. Such widespread replacement of legacy equipment is enormously expensive.

As can be seen, the current proposals to solve the diminishing IP addresses problem are inadequate and/or unduly expensive. Therefore, a system is needed that can effectively alleviate the diminishing IP addresses problem without unreasonable costs.

SUMMARY OF THE INVENTION

The present invention, roughly described, provides for a system for using domain names to route data sent to a destination on a network. One example includes routing data to a destination on a stub network. A stub network is a network owned by an organization that it is connected to the Internet through one or more gateways. Nodes in the stub network may be made visible to other nodes on the Internet or to other nodes in other stub networks interconnected through the Internet. Rather than use an entire set of global addresses for a Class A, B or C network, each corporate entity or stub network can be assigned one or a small number of global addresses. Each of the hosts can be assigned a local address. The same local addresses can be used by many different organizations. When a source entity sends data to a destination entity in a stub network with a local address, the data is sent to a global address for the destination's network. The global address is assigned to a Domain Name Router in communication with the destination's network. The Domain Name Router serves as a gateway between the Internet and the stub network. The Domain Name Router routes IP traffic between nodes on the Internet (identified by their globally unique IP addresses) and nodes in its stub network. The source entity embeds the destination's domain name and its own domain name somewhere inside the data. The Domain Name Router receives the data, extracts the destination's domain name from the data, translates that domain name to a local address in its stub network and sends the data to the destination. Note that the source entity could have either a local address or a global address and still be able to utilize the present invention.

One method for practicing the present invention includes packaging at least a subset of data to be communicated to an entity on a network into a data unit. That data unit is sent to a Domain Name Router or other similar entity. Information representing the domain name of the destination is extracted from the data unit and used to determine a local address for the destination. Once a local address is determined, the data unit is sent to that local address.

The data unit can be formed by receiving a first set of data and a domain name. A field (or other subset) is created, which includes a first set of information representing the domain name. The field is appended to the first set of data to create the data unit. The data unit is sent to the Domain Name Router. The data unit could be an IP packet, a TCP segment, or any other data unit suitable for use with the present invention as long as the domain name can be reliably extracted from the data. In one embodiment, the information used to represent the domain name could include an encrypted version of the domain name, an encoded version of the domain name, a compressed version of the domain name, etc.

In one embodiment, the data unit sent to the Domain Name Router includes a global IP address for the Domain Name Router. After translating the domain name to a local address, the Domain Name Router will replace the global address for the Domain Name Router with the local address of the destination. The step of replacing the global address with the local address can include adjusting any appropriate checksums or any other necessary fields in the data unit.

The Domain Name Router can be implemented using software stored on a processor readable storage medium and run on a computer or a router. Alternatively, the Domain Name Router can be specific hardware designed to carry out the methods described herein.

These and other objects and advantages of the invention will appear more clearly from the following detailed description in which the preferred embodiment of the invention has been set forth in conjunction with the drawings.

DETAILED DESCRIPTION

Figure 1:
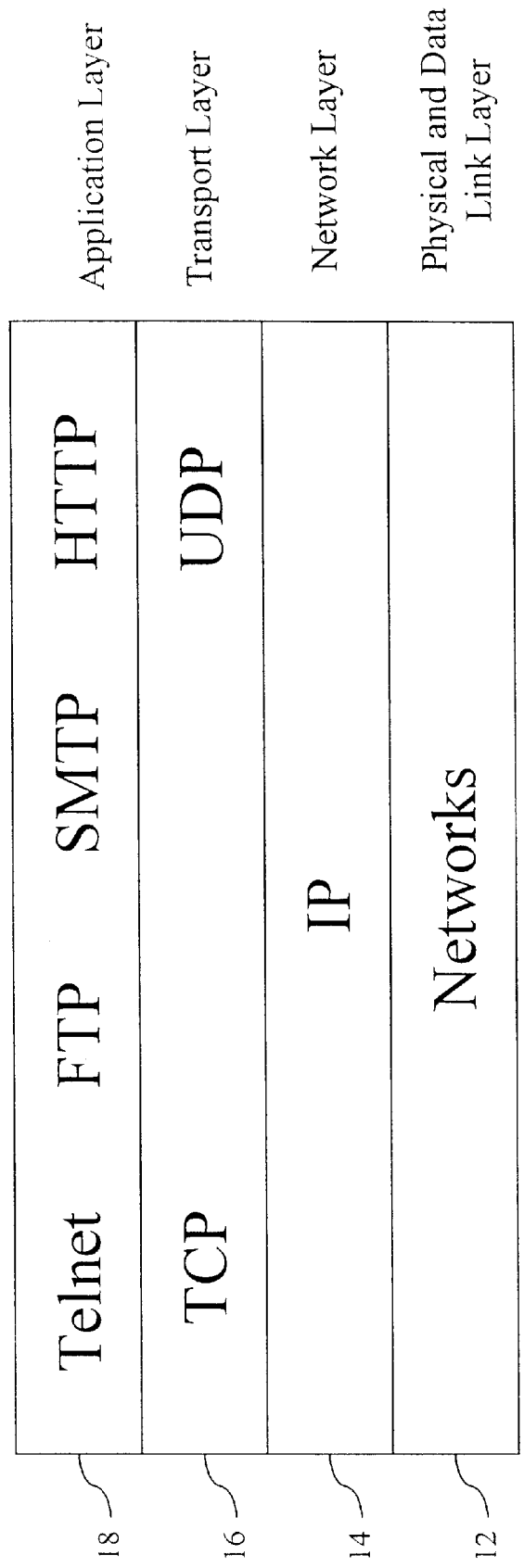
FIG. 1 is a symbolic diagram showing the layers of the TCP/IP Reference Model.

FIG. 1 shows the TCP/IP reference model for designing and building a network. The model includes four layers: Physical and Data Link Layer 12, Network Layer 14, Transport Layer 16, and Application Layer 18. The physical layer portion of Physical and Data Link Layer 12 is concerned with transmitting raw bits over a communication channel. The design issues include ensuring that when one side sends a 1 bit it is received by the other side as a 1 bit, not as a 0 bit. Typical questions addressed are how many volts should be used to represent a 1 bit, how many volts to represent a 0 bit, how many microseconds a bit lasts, whether transmissions may proceed simultaneously in both directions, how the initial connection is established, how it is torn down when both sides are finished, and how many pins the network connector has. The data link portion of Physical and Data Link Layer 12 takes the raw transmission facility and transforms it into a line that appears to be relatively free of transmission errors. It accomplishes this task by having the sender break the input data up into frames, transmit the frames and process the acknowledgment frames sent back by the receiver.

Network Layer 14 permits a host to inject packets into a network and have them travel independently to the destination. The protocol used for Network Layer 14 on the Internet is called the Internet Protocol (IP).

Transport Layer 16 is designed to allow peer entities on the source and destination to carry on a "conversation." On the Internet, two end-to-end protocols are used. The first one, the Transmission Control Protocol (TCP), is a reliable connection-oriented protocol that allows a byte stream originating on one machine to be delivered without error to another machine on the Internet. It fragments the incoming byte stream into discrete packets and passes each one to Network Layer 14. At the destination, the receiving TCP process reassembles the received packets into the output stream. TCP also handles flow control to make sure a fast sender cannot swamp a slow receiver with more packets than it can handle. The second protocol used in Transport Layer 16 on the Internet, User Datagram Protocol (UDP), is an unreliable connectionless protocol for applications that do not want TCP sequencing or flow control. UDP is used for one-shot, client server type requests-reply queries for applications in which prompt delivery is more important than accurate delivery. Transport Layer 16 is shown as being above Network Layer 14 to indicate that Network Layer 14 provides a service to Transport Layer 16. Similarly, Transport Layer 16 is shown below Application Layer 18 to indicate that Transport Layer 16 provides a service to Application Layer 18.

Application Layer 18 contains the high level protocols, for example, Telnet, File Transfer Protocol (FTP), Electronic Mail—Simple Mail Transfer Protocol (SMTP), and Hyper-Text Transfer Protocol (HTTP).

The following discussion describes the network and transport layers in more detail. The main function of Network Layer 14 is routing packets from a source entity to a destination entity. In most subnets, packets will require multiple hops to make the journey. The Network Layer software uses one or more routing methods for deciding which output line an incoming packet should be transmitted on. There are many routing methods that are well known in the art that can be used in a network layer. For purposes of this patent, no specific routing method is required. Any suitable routing method known in the art will suffice. Some examples of known routing methods include shortest path routing, flooding, flow based routing, distance vector routing, link state routing, hierarchical routing, routing for mobile hosts, broadcast routing and multicast routing. Within a network on the Internet, a suitable routing method may also be based on the Distance Vector Protocol or its successor the Open Shortest Path First (OSPF) protocol. Between networks on the Internet, the Border Gateway Protocol (BGP) can be used.

Communication in the Internet works as follows. Transport Layer 16 breaks up a stream of data from Application layer 18 into a number of segments. Network Layer 14, using the Internet Protocol, transports the segments in one or more IP packets from source to destination, without regard to whether these machines or entities are on the same network. Each segment can be fragmented into small units as it is transported. When all of the fragments finally get to the destination machine, they are reassembled by Network Layer 14 into the original segment. This segment is then handed to the Transport Layer 16, which inserts it into the receiving process' (Application Layer 18) input stream.

Figure 2:
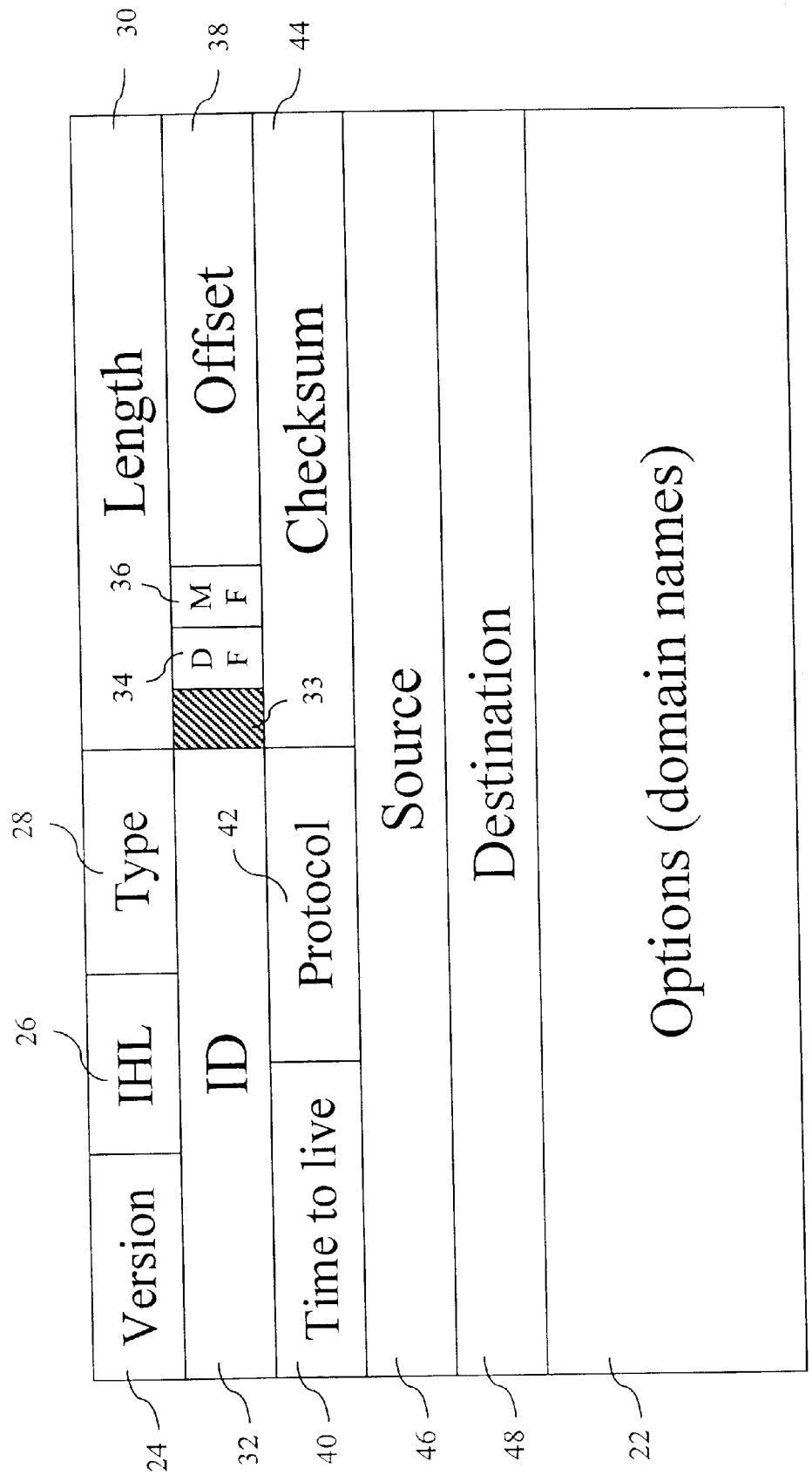
FIG. 2 shows the Internet Protocol (IP) header.

An IP packet consists of a header and a data portion. The format of an IP header is shown in FIG. 2. FIG. 2 shows six rows making up the header. Each row is 32 bits wide. The first five rows of the header comprise a 20 byte fixed portion of the header. The last row of the header provides a variable sized Options section 22. Version field 24 keeps track of which version of the protocol the packet belongs to. The current version used on the Internet is version 4. IHL field 26 describes the length of the header in 32 bit words. Type field 28 indicates the type of service requested. Various combinations of reliability and speed are possible. Length field 30 includes the size of the packet, including both the header and the data. Identification field 32 is needed to allow the destination host to determine which segment the received fragment belongs to. All fragments of a segment contain the same identification value. Next comes three flags, which include an unused bit 33 and then two 1 bit fields 34 and 36. In one embodiment of the present invention, the unused bit 33 is used to indicate that the source of the packet uses a domain name for unique identification on the Internet instead of using a globally unique IP address. DF field 34 stands for don't fragment. It is an order to the routers not to fragment the segment because the destination is incapable of putting the pieces back together again. MF field 36 stands for more fragments. All fragments except for the last one have this bit set. Fragment offset field 38 indicates where in the current segment this fragment belongs. Time to Live field 40 is used to limit packet lifetime. It is supposed to count time in seconds, allowing a maximum life time of 255 seconds. In practice, it may count hops. The time is decremented on each hop by a router. When the time to live hits 0, the packet is discarded and a warning is sent back to the source using an Internet Control Messaging Protocol (ICMP) packet. This feature prevents packets from wandering around forever. Protocol Field 42 indicates which transport layer type is to receive the segment. TCP is one possibility, UDP is another. The present invention is not limited to any particular protocol. Checksum field 44 verifies the header. One method for implementing a checksum is to add up all 16 bit half words as they arrive and take the ones compliment of the result. Note that the checksum must be recomputed at each hop because the Time to Live field 40 changes. Source field 46 indicates the IP address for the source of the packet and destination field 48 indicates the IP address for the destination of the packet.

Options field 22 is a variable length field designed to hold other information. Currently, options used on the Internet indicate security, suggested routing path, previous routing path and time stamps, among other things. In one embodiment of the present invention, is contemplated that the source and destination's domain names are added to Options field 22. In one alternative, the actual full ACSII strings can be added directly into the options field, first listing the source's domain name and followed by the destination's domain name (or vice versa). In other alternatives, the two domain names can be encoded, compressed, encrypted or otherwise altered to provide more efficient use of storage space, security or compatibility. In embodiments where the domain name is encoded, encrypted, compressed, etc., the information stored is said to represent the domain name. That is, an entity can read that information and extract (or identify) the domain name from that information. That extraction or identification can be by unencoding, decoding, decompressing, unencrypting, etc.

In another embodiment, the domain names of the source, destination or both are added to the end of the data portion (e.g. data field 108 of FIG. 4) of a packet as a trailer. In this case, Length field 30 needs to account for the extra bytes added at the end of the data field. Legacy routers can treat this trailer as an integral part of the data field and ignore it.

Network layer 14 is comprised of a number of processes running on the source, destination and, possibly, one or more routers. The process(es) implementing the Network Layer on the source or destination machines can be in the operating system kernel, in a separate user process, in a library package, in a network application, on a network interface card or in other suitable configurations.

The network entity, the process implementing the network layer, receives a segment from the transport layer process. The network entity appends a header to the segment to form a packet. The packet is sent to a router on a network or the Internet. Each router has a table listing IP addresses for a number of distant networks and IP addresses for hosts in the network closest to the router. When an IP packet arrives, its destination address is looked up in the routing table. If the packet is for a distant network, it is forwarded to the next router listed in the table. If the distant network is not present in the router's tables, the packet is forwarded to a default router with more extensive tables. If the packet is for a local host (e.g. on the router's Local Area Network (LAN)), it is sent directly to the destination.

Although every machine in the Internet has an IP address, these addresses alone cannot be used for sending packets because the data link layer does not understand Internet addresses. Most hosts are attached to a LAN by an interface board that only understands LAN addresses. For example, every Ethernet board comes equipped with a 48 bit Ethernet address. Manufacturers of Ethernet boards request a block of addresses from a central authority to ensure that no two boards have the same address. The boards send and receive frames based on a 48 bit Ethernet address. For one entity to transmit data to another entity on the same LAN using an Ethernet address, the entity can use the Address Resolution Protocol (ARP). This protocol includes the sender broadcasting a packet onto the Ethernet asking who owns the particular IP address in question. That packet will arrive at every machine on the Ethernet and each machine will check its IP address. The machine that owns the particular IP address will respond with its Ethernet address. The sending machine now has the Ethernet address for sending data directly to the destination on the LAN. At this point, the Data Link Layer 12 on the sender builds an Ethernet frame addressed to the destination, puts the packet into the payload field of the frame and dumps the frame onto the Ethernet. The Ethernet board on the destination receives the frame, recognizes it is a frame for itself, and extracts the IP packet from the frame.

The goal of Transport Layer 16 is to provide efficient and reliable service to its users (processes in Application Layer 18). To achieve this goal, Transport Layer 16 makes use of the services provided in Network Layer 14. The one or more processes that implement the transport layer are called the transport entity. The transport entity can be in the operating system kernel, in a separate user process, in a library package, in network applications or on the network interface card. Typically, executable software implementing a transport entity or a network entity would be stored on a processor readable storage medium (e.g. a hard disk, CD-ROM, floppy disk, tape, memory, etc.).

The transport layer improves the quality of service of the network layer. For example, if a transport entity is informed halfway through a long transmission that its network connection has been abruptly terminated, it can set up a new network connection to the remote transport entity. Using this new network connection, the transport entity can send a query to the destination asking which data arrived and which did not, and then pick up from where it left off. In essence, the existence of Transport Layer 16 makes it possible for a transport service to be more reliable than the underlying network service. Lost data can be detected and compensated for by the Transport Layer 16. Furthermore, transport service primitives can be designed to be independent of the network service primitives, which may vary considerably from network to network.

TCP was specifically designed to provide a reliable end-to-end byte stream over an unreliable internetwork. An internetwork differs from a single network because different parts may have different topologies, bandwidths, delays, packet sizes and other parameters. Each machine supporting TCP has a TCP entity. A TCP entity accepts user data streams from local processes (application layer), breaks them up into pieces and sends each piece as a separate segment to the network entity. When segments arrive at a machine they are given to the TCP entity, which reconstructs the original byte stream. The IP layer gives no guarantee that segments will be delivered properly, so it is up to the TCP entity to time out and retransmit them as need be. Segments that do arrive may do so in the wrong order. It is also up to the TCP entity to reassemble them into messages in the proper sequence. In short, TCP must furnish the reliability that most users want and that the Internet Protocol does not provide.

TCP service is obtained by having both the sender and receiver create endpoints called sockets. Each socket has a socket number (or address) consisting of the IP address of the host and a 16 bit number local to that host called a port. To obtain TCP service, a connection must be explicitly established between a socket on the sending machine and a socket on the receiving machine. Port numbers below 256 are called well known ports and are reserved for standard services. For example, any process wishing to establish a connection to a host to transfer a file using FTP can connect to the destination host port 21. Similarly, to establish a remote log-in session using Telnet, port 23 is used.

When an application wishes to set up a connection to a remote application process, the application process issues a connect primitive requesting that the transport layer set up a connection between two sockets. If the connect succeeds, the process returns a TCP reference number used to identify the connection on subsequent calls. After the connection is established, the application process can issue a send command and pass the TCP reference number with the data (or pointer to data) for sending to the destination. The present invention also requires that when the application issues its connect command, in addition to sending the two socket addresses the application also provides the transport entity with the domain name for the destination. In addition, the operating system or the application should make the domain name of the source available to the connect command. One alternative to accomplish this is to have the operating system retrieve the domain name from the DNR or from a local DNS server through a reverse DNS IP lookup. The source's domain name can be retrieved at start-up time of a node and be made available to the network layer. Another alternative is to have the application provide the domain name of the source either directly or through a reverse DNS IP lookup. These domain names will be associated with the TCP reference number. Alternatively, the domain names can be passed to the transport layer each time a request to send data is made.

When receiving a request to send data, the TCP entity builds a data unit called a segment. The TCP entity interfaces with the network entity by requesting the network entity to either send a packet or receive a packet. A request to send a packet can include up to seven parameters. The first parameter will be a connection identifier. The second parameter is a flag indicating more data is coming. The third parameter indicates the packet type. The fourth parameter is a pointer to the actual data to be transmitted (i.e. the segment). The fifth parameter indicates the number of bytes in the segment. The sixth parameter is the source's domain name. The seventh parameter is the destination's domain name.

Figure 3:
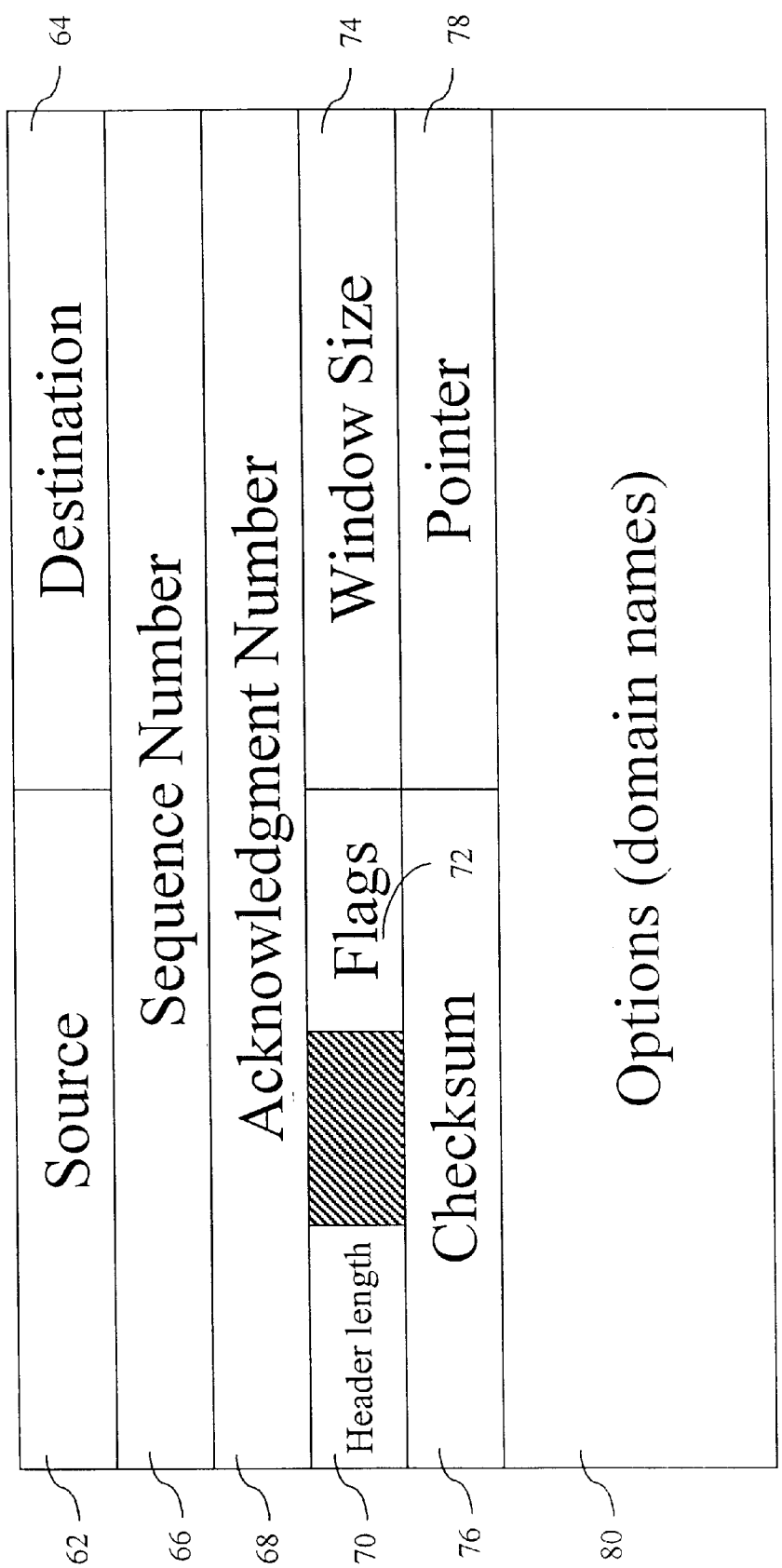
FIG. 3 shows the Transmission Control Protocol (TCP) header.

The segment that is created by the TCP entity and passed to the IP entity includes a header section and a data section. FIG. 3 shows a layout of the TCP header. The header consists of a fixed format 20 byte header followed by a variable length Options field 80. The entire header is appended to the data to comprise a segment. In FIG. 3, each of the first five rows represent 32 bits. The option field 80 can be one or more 32 bit words. Source field 62 indicates the source's port. Destination field 64 identifies the destination's port. Sequence number field 66 and acknowledge number field 68 are used for tracking the sequence of segments exchanged between the sender and the receiver. Header length field 70 indicates the number of 32 bit words contained in the TCP header. Header length field 70 is followed by six one bit flags 72. The first flag indicates the presence of urgent data. The second flag indicates that the acknowledgment number 68 is valid. The third flag indicates that the data is PUSHed data (data that should be sent immediately). The fourth flag is used to reset a connection. The fifth flag is used to establish connections and the sixth flag is used to release a connection. Window size field 74 indicates the maximum number of bytes that can be sent without waiting for an acknowledgment. Checksum field 76 provides a checksum for the header, the data and a conceptual pseudo header. The pseudo header includes a 32 bit IP address of the source, a 32 bit IP address of the destination, the protocol number for TCP and the byte count for the TCP segment (including the header).

Option field 80 was designed to provide a way to add extra facilities not covered by the regular header. In some instances, the option field is used to allow a host to specify the maximum TCP payload it is willing to accept. In one embodiment of the present invention, the source's domain name and/or destination's domain name are stored in Options Field 80. In another embodiment, the source's and/or destination's domain name are stored in the data portion (see data portion 102 of FIG. 4) of the TCP segment.

The TCP/IP reference model also supports the connectionless transport protocol, UDP. UDP provides a way for applications to send encapsulated raw IP packets and send them without having to establish a connection. A UDP segment consists of an 8 byte header followed by the data. The head includes the source port, destination port, the length of the header and data, and a checksum.

Figure 4:
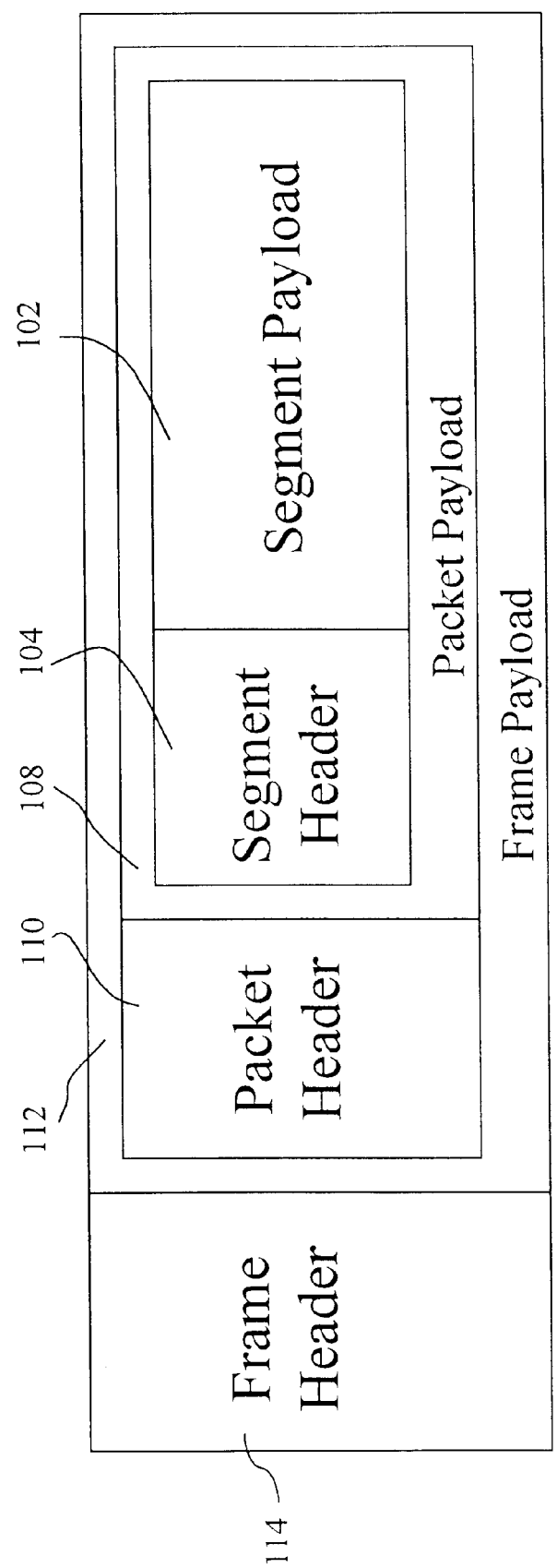
FIG. 4 shows the nesting of segments, packets and frames.

FIG. 4 shows the relationship between segments, packets and frames. When an application issues a request to send data, TCP breaks up the data into segments. The segment includes a header 104 and a payload (data portion) 102. The segment is passed to the IP entity (network layer entity). The IP entity incorporates the segment into the data portion 108 (IP payload) and appends a header 110 to that data portion to form a packet. Thus, the payload for an IP packet includes the TCP segment. The IP packet is then given to the data link layer 12 which takes the packet and appends a header 114 to the packet to create a frame. Thus, the IP packet is the payload 112 for the frame.

The present invention provides for a Domain Name Router (DNR) that uses domain names to route data sent to a destination on a network. The IP address space is divided into global addresses and local address. Global addresses are unique addresses that should only be used by one entity having access to the Internet. Local addresses are used for entities not having direct access to the Internet. Since local addresses are not generally used on the Internet, many private networks can have entities using the same local address. To avoid collisions, no entity should use a local address on the Internet.

Rather than use the entire set of global addresses for a Class A, B or C network, each corporate entity or network can be assigned one or a small number of global address to be used by the DNR. Each of the hosts on the network can be assigned a local address. The same local addresses can be used by many different networks. When a source entity sends data to a destination entity with a local address, the data is sent to the global address for the destination's network. The source entity embeds the destination's domain name and its own domain name somewhere inside the data. Since the DNR for the destination's network is assigned the global address for the destination's network, the DNR receives the data. The DNR extracts the destination's domain name from the data, translates that domain name to a local address and sends the data to the destination. Note that the source entity could have either a local address or a global address and still be able to utilize the present invention.

Figure 5:
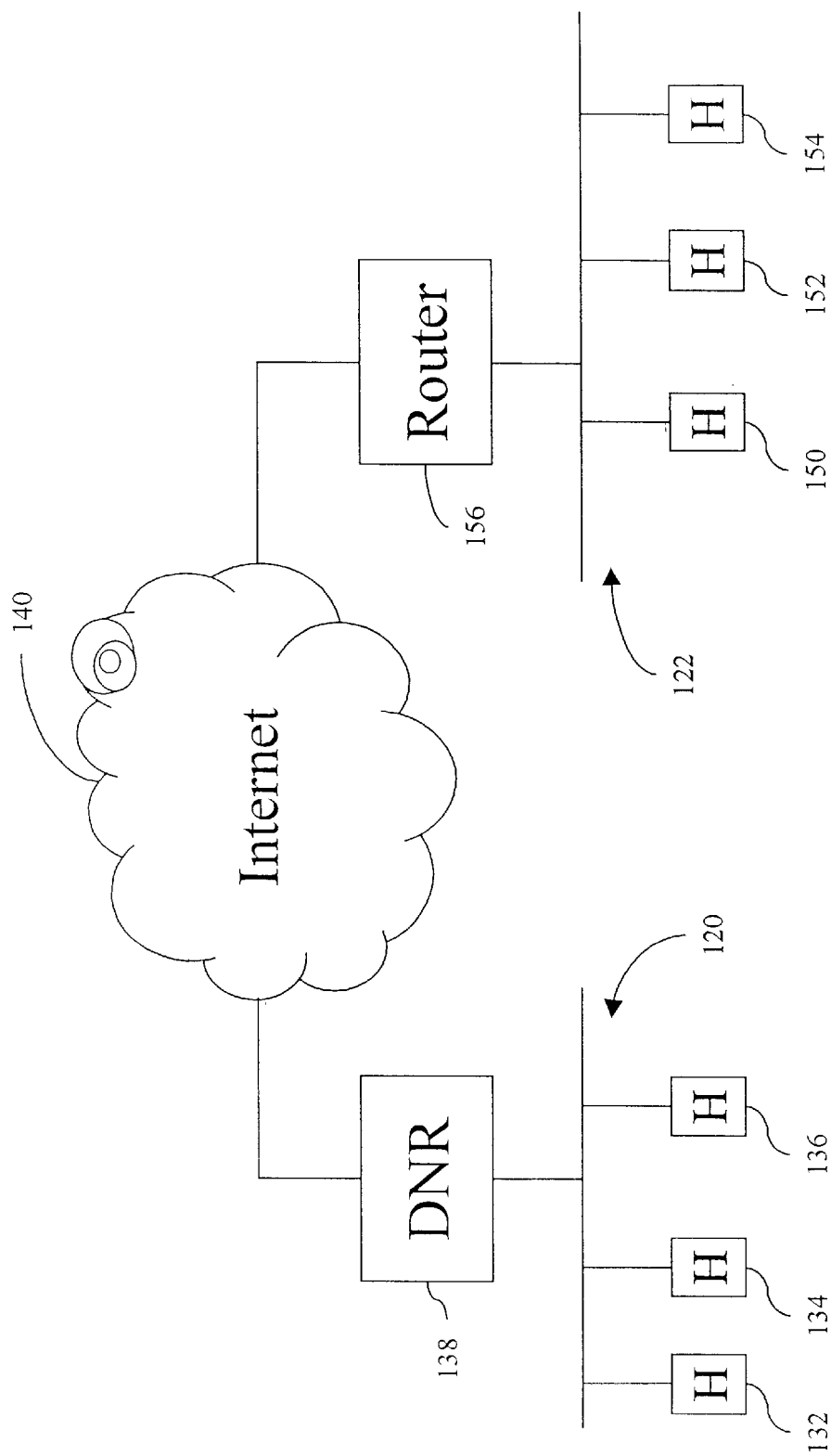
FIG. 5 is a block diagram of two stub networks connected to the Internet.

FIG. 5 shows two LANs 120 and 122 connected to Internet 140. LAN 120 includes three hosts 132, 134 and 136 connected to each other and to DNR 138. DNR 138 is also connected to Internet 140. Network 122 includes three hosts 150, 152 and 154 connected to each other and to router 156. Router 156 is also connected to Internet 140. DNR 138 is able to route IP packets received from the Internet to a local host (132, 134, 136) by using the domain name in accordance with the present invention. In one embodiment, router 156 is also a DNR; however, router 156 need not be a DNR.

Figure 6:
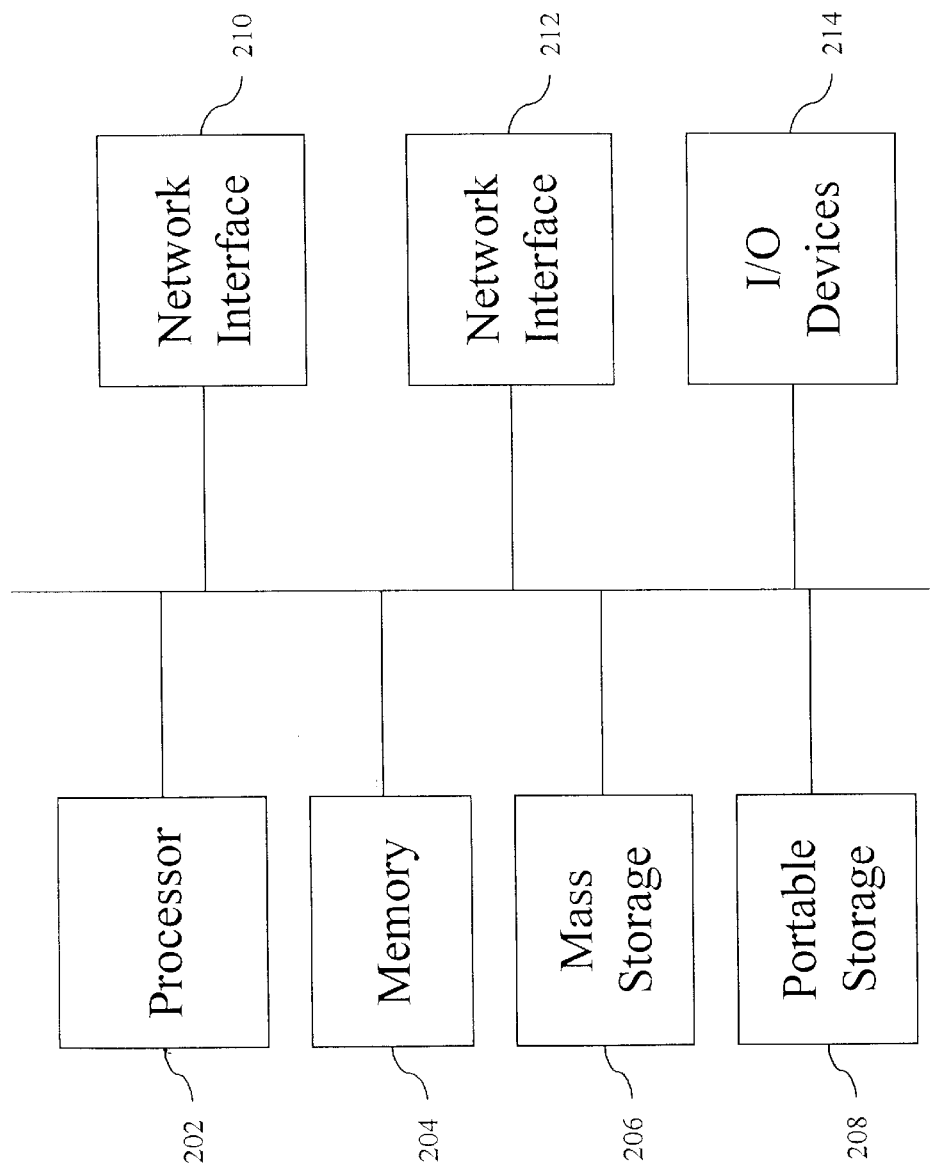
FIG. 6 is a simplified block diagram of one exemplar hardware platform for implementing a Domain Name Router.
Figure 10:
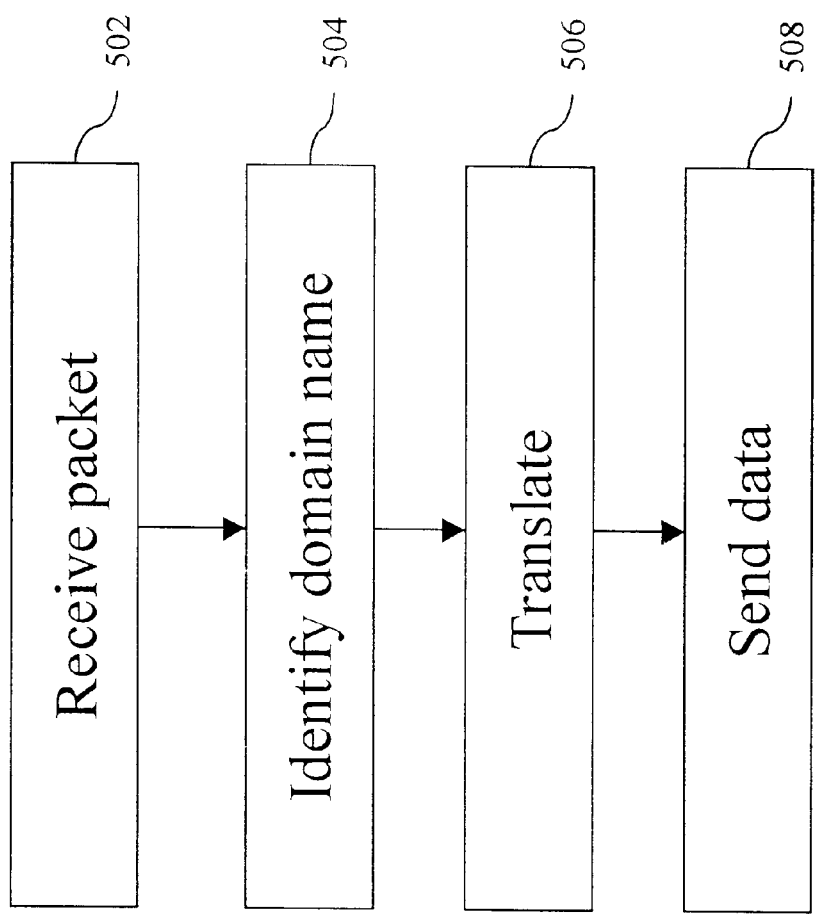
FIG. 10 is a flow chart describing the steps performed by a Domain Name Router.
Figure 11:
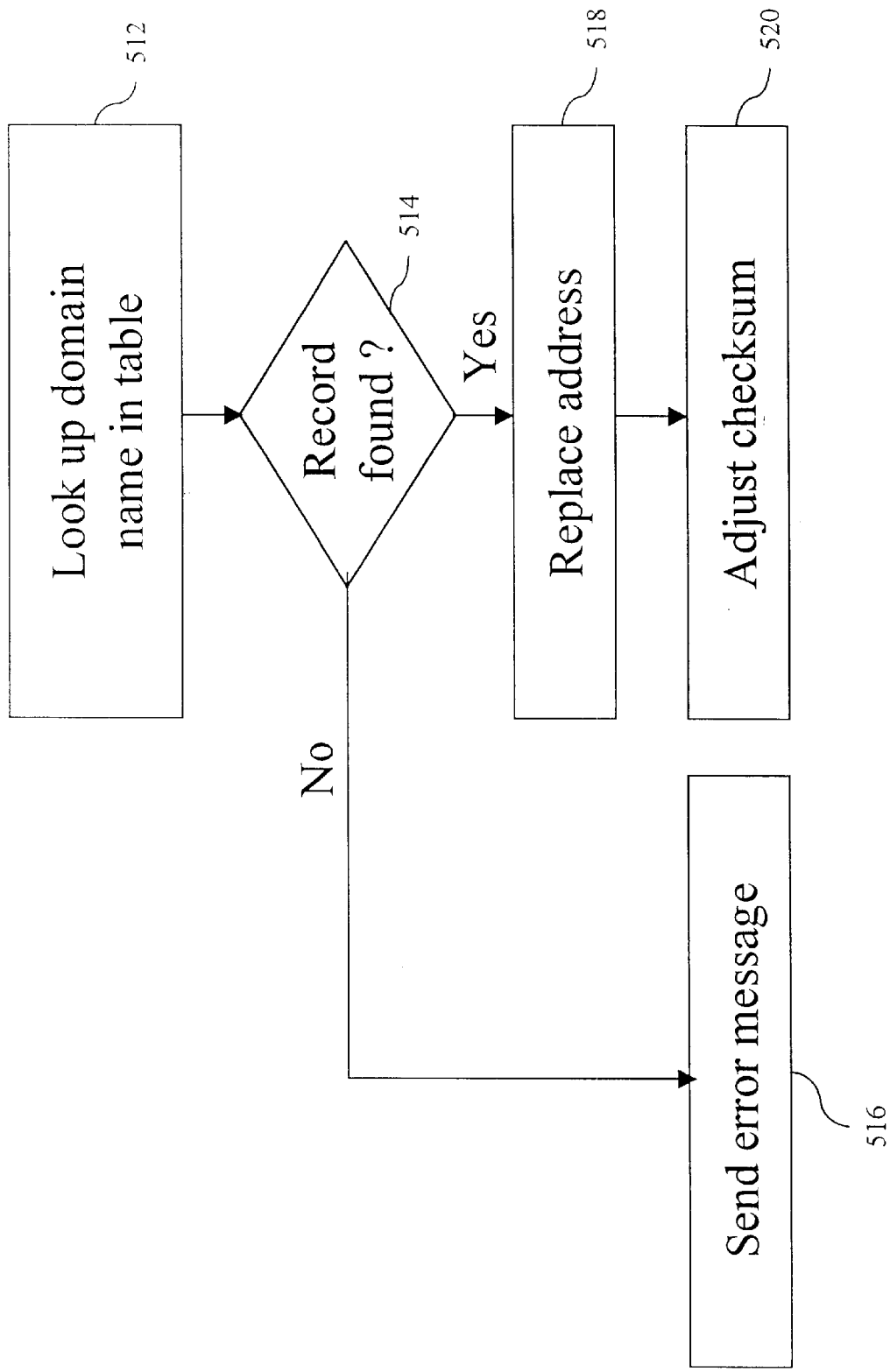
FIG. 11 is a flow chart describing the translation step of FIG. 10.

FIG. 6 shows one example of a hardware architecture for a DNR. The DNR includes a processor 202, a memory 204, a mass storage device 206, a portable storage device 208, a first network interface 210, a second network interface 212 and I/O devices 214. Processor 202 can be a Pentium Processor or any other suitable processor. The choice of processor is not critical as long as a suitable processor with sufficient speed and power is chosen. Memory 204 could be any conventional computer memory. Mass storage device 206 could include a hard drive, CD-ROM or any other mass storage device. Portable storage 208 could include a floppy disk drive or other portable storage device. The DNR includes two network interfaces. In other embodiments, the DNR could include more than two network interfaces. The network interfaces can include network cards for connecting to an Ethernet or other type of LAN. In addition, one or more of the network interfaces can include or be connected to a firewall. Typically, one of the network interfaces will be connected to the Internet and the other network interface will be connected to a LAN. I/O devices 214 can include one or more of the following: keyboard, mouse, monitor, front panel, LED display, etc. Any software used to perform the routing methods and/or the methods of FIGS. 10 and 11 are likely to be stored in mass storage 206 (or any form of non-volatile memory), a portable storage media (e.g. floppy disk or tape) and, at some point, in memory 204. The above described hardware architecture is just one suitable example depicted in a generalized and simplified form. The DNR could include software running on a computer, dedicated hardware, a dedicated router with software to implement the domain name routing or other software and/or hardware architectures that are suitable.

In one embodiment, the domain name routing is done at the network layer. Thus, the domain names are inserted into Options field 22 of an IP header. Other embodiments can place the domain names in other portions of an IP packet, including the data portion (such as a trailer to the data). In other alternatives, the domain name can be stored in the options field 80 of a TCP segment, the data portion of a TCP segment, other fields of the TCP segment, data sent from the application layer, or in another data unit. If the domain names are inserted in Options field 22, it is not necessary to place them in Options field 80. Similarly, if the domain names are inserted in Options field 80, it is not necessary that they appear in Options field 22. However, in one embodiment, it may be simpler to place the domain names in multiple data units (e.g. both options fields). The point is that the domain names must be somewhere inside an IP packet, whether it is in the payload (or a trailer) or the header.

FIGS. 7–10 are flow charts which describe the process for sending data according to the present invention. It is assumed that a message is being sent from host 150 to host 132. In this example, it is assumed that host 132 has a local address and host 150 has a global address. For example purposes, it is assumed that host 150 and 132 are computers. Alternatively, host 150 and 152 can be other electronic devices that can communicate on the Internet.

Figure 7:
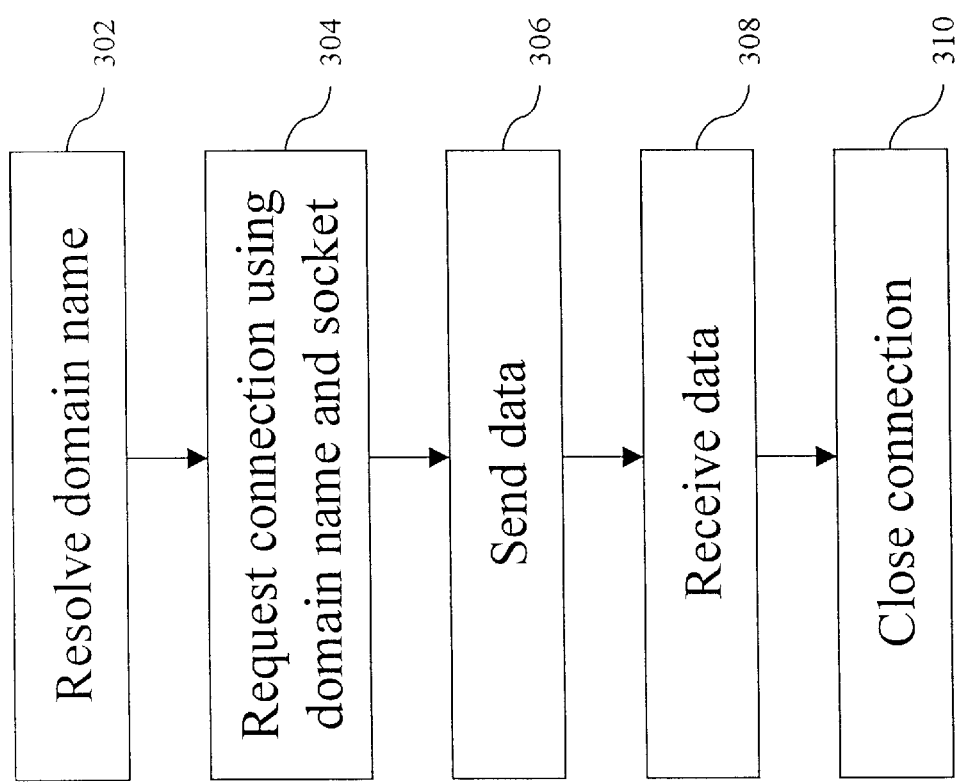
FIG. 7 is a flow chart describing the steps used by an application process to send data according to the present invention.

FIG. 7 describes an application layer process predominantly run on host 150. In step 302, host 130 resolves the domain name. The user wants to send data to another process. The user provides the domain name of the destination. A resolver process converts the domain name to an IP address.

Every domain, whether it is a single host or a top level domain, has a set of resource records associated with it. For a single host, the most common resource record is its IP address. When a resolver process gives a domain name to the domain name system, it gets back the resource records associated with that domain name.

A resource record has five fields: domain name, time to live, class, type and value. The time to live field gives an indication of how stable the record is. Information that is highly stable is assigned a large value such as the number of seconds in a day. The third field is the class. For the Internet the class is IN. The fourth field tells the type of resource record. One domain may have many resource records. There are at least eight types of resource records that are important to this discussion: SOA, A, MX, NS, CNAME, PTR, HINFO, and TXT. The value field for an SOA record provides the name of the primary source of information about the name server zone, e-mail address of its administrator, a unique serial number and various flags and time outs in the value field. The value field for an A record holds a 32 bit IP address for the host. The value field for the MX record holds the domain name of the entity willing to accept e-mail for that particular domain name. The NS record specifies name servers. The CNAME record allows aliases to be created in the value field. A PTR record just points to another name in the value field, which allows look up of an IP address for a particular domain name. The value field of the HINFO record indicates the type of machine and operating system that the domain name corresponds to. An example of resource records for a host is found below in Table 1.

TABLE 1

| Domain Name | Time to Live | Class | Type | Value |
| --- | --- | --- | --- | --- |
| saturn.ttc.com | 86400 | IN | HINFO | Sun unix |
| saturn.ttc.com | 86400 | IN | A | 188.68.70.1 |
| saturn.ttc.com | 86400 | IN | MX | mars.ttc.com |

Table 1 includes three resource records for an entity with a domain name of saturn.ttc.com. The first resource record indicates a time to live of 86,400 seconds (one day). The type of record is HINFO and the value indicates that the entity is a Sun workstation running the UNIX operating system. The second line is a resource record of type A, which indicates that the IP address for saturn.ttc.com is 198.68.70.1. The third line indicates that e-mail for saturn-.ttc.com should be sent to mars.ttc.com. It is likely that there will be a DNS record, which indicates the IP address for mars.ttc.com.

The DNS name space is divided into non-overlapping zones. Each zone is some part of the Internet space and contains name servers holding the authoritative information about that zone. Normally, a zone will have one primary name server and one or more secondary name servers which get their information from the primary name server. When a resolver process has a query about a domain name, it passes the query to one of the local name servers. If the host being sought falls under the jurisdiction of that name server, then that domain name server returns the authoritative resource record. An authoritative record is one that comes from the authority that manages the record. If, however, the host is remote and no information about the requested host is available locally, the name server sends a query message to the top level name server for the host requested. The top level name server will then provide the resource records to the local name server which may cache the information and forwarded it to the original resolver process. Since the cached information in the local name server is not the authoritative record, the time to live field is used to determine how long to use that information.

In one embodiment, DNR 130 serves as the authority DNS server for the hosts on LAN 120. Thus, DNR 130 would store resource records for host 132. One of the resource records for host 132 would be a type A record correlating the global address of DNR 130 with the domain name for host 132.

Looking back at FIG. 7, after the domain name has been resolved the application process is in possession of the IP address for its desired destination. In step 304, the application process requests the transport layer (e.g. TCP) to establish a connection. A socket must have been set up in both the source and destination. The application process submits the source's socket, the destination's socket, the source's domain name and the destination's domain name to the transport layer. In step 306, the application requests that the transport layer send data. In step 308, the application process may request that the transport layer receive data (optional). In step 310, the connection between the source and destination is closed.

Figure 8:
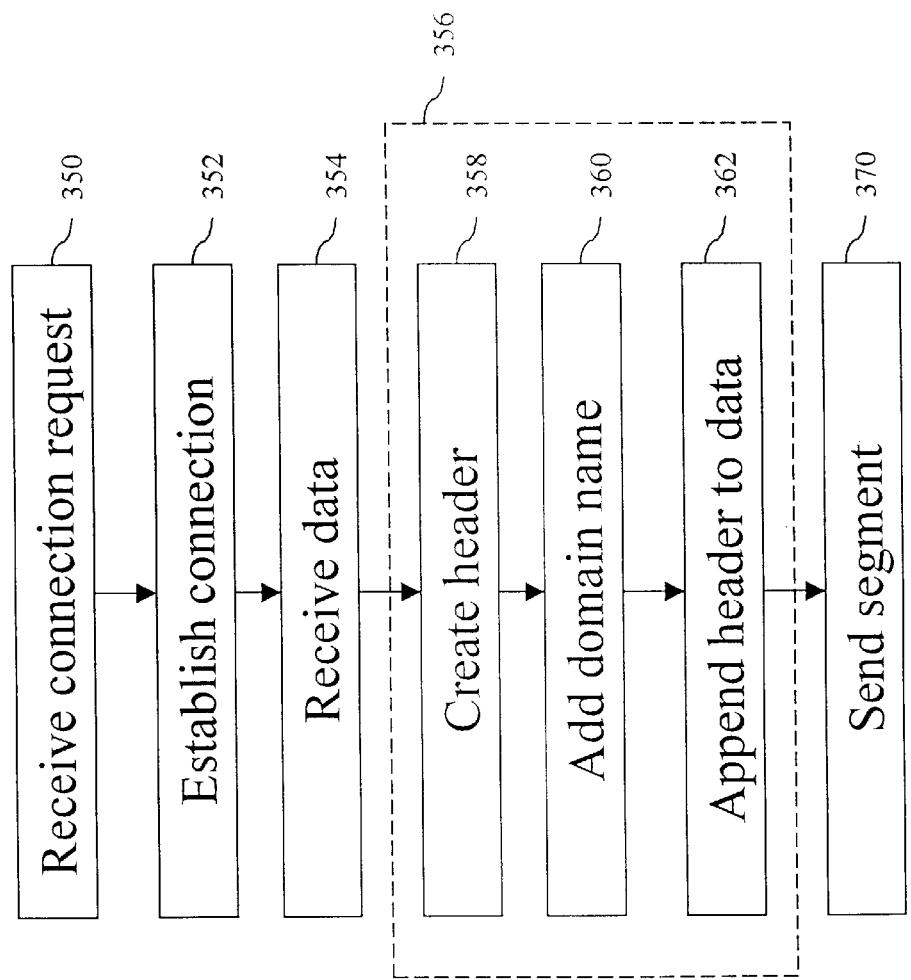
FIG. 8 is a flow chart describing the steps used by a transport layer process to send data according to the present invention.

FIG. 8 explains how the transport layer of host 150 sends the data in conjunction with the request by the application layer in the steps of FIG. 7. In step 350, the transport layer (e.g. TCP) receives the connection request from the application layer. In step 352, the transport layer establishes a connection between the source socket and destination socket. In one embodiment, the connection request includes the domain names of the destination and the source. Alternatively, the domain names can be passed during step 354. In step 354, the transport layer receives from the application layer the data to be sent to the destination socket. Step 354 can include actually receiving data or a pointer to data. The data received can be broken up into one or more segments and each of the segments will be sent separately. In step 356, one or more segments are created. Creating the segments includes the step of creating a header (step 358), adding the source's domain name and the destination's domain name to the header or data portion (step 360), and appending the header to the data (step 362). If the domain names are to be added to the IP packet and not to the TCP segment, then step 360 is skipped. After the segment is created, the transport layer sends the segments in step 370. Sending a segment includes passing the segment to the network layer.

Figure 9:
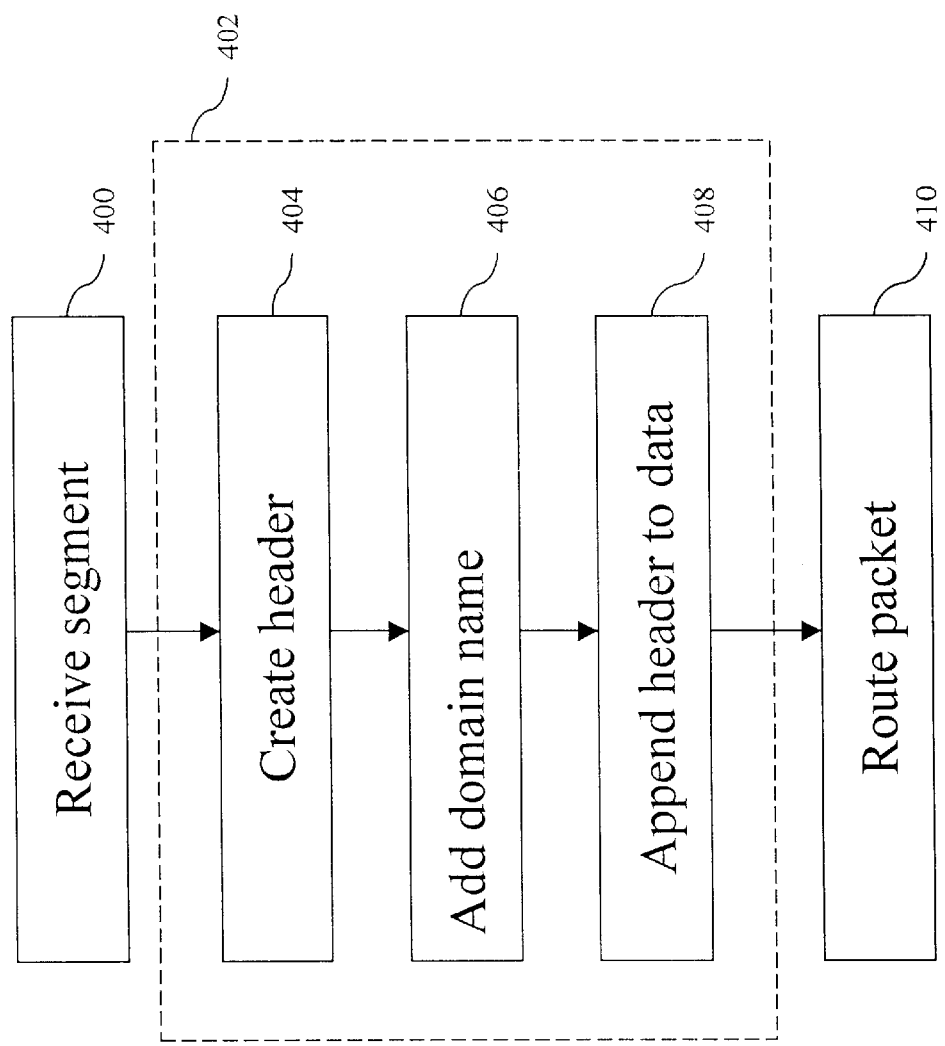
FIG. 9 is a flow chart describing the steps used by a network layer process to send data according to the present invention.

FIG. 9 describes the steps taken by the network layer on host 150 to send data in response to the steps of FIG. 8. In step 400, the network layer receives a segment and a request to send a packet on the Internet (or other network). As discussed above, the request to send a packet passes the source and destination domain names. Alternatively, the domain names can be embedded in the data. In step 402, a packet is created. The step of creating the packet includes creating the header (step 404), adding the domain names of the source and destination to the header or data portion (step 406) and appending the header to the data (step 408). If the domain name is to be added as part of the TCP segment and not part of the IP packet, step 406 can be skipped. After the packet is created in step 402, the network layer routes the packet in step 410. The packet is routed from host 150, through router 156, through Internet 140 and to DNR 138. The IP packets routed include the destination IP address of DNR 138 and the source IP address of host 150, both of which are global addresses. The IP packet also includes the domain name of hosts 132 and 150. In one embodiment, the IP packet would not include the source's domain name. Note that the steps of FIG. 9 can be repeated for each segment.

In one embodiment, host 150 has a local address and router 156 is a DNR. When an IP packet sent from host 150 is received at router 156, the local address of host 150 is replaced by the global address of router 156.

FIG. 10 describes the steps performed by DNR 138 when it receives the IP packet from host 150. In step 502, DNR 138 receives the IP packet. In step 504, DNR 138 identifies the destination's domain name from the packet. Identifying the domain name could include looking for the domain name in the header, data portion or other location in an IP packet, TCP segment, application data, etc. Identifying the domain name may include reading an ASCII string. Alternatively, if the domain names are compressed, encrypted, encoded, etc., then DNR 148 would need to decode, decompress, unencrypt, etc. In step 506, DNR 138 translates the destination domain name to a local address and in step 508 the packet is routed to the destination with the local address.

FIG. 11 describes one exemplar embodiment for performing the step of translating the destination domain name to a local address (step 506 of FIG. 10). Other suitable methods of translating a domain name can also be used. Translating a domain name can include less than all of the steps of FIG. 11. In step 512, DNR 138 looks up the domain name in a DNR table stored in its memory or other storage device. The DNR table includes domain names and corresponding local addresses. In one embodiment, the DNR table could also include Ethernet addresses. It is also possible that the local network includes multiple DNRs, forming a tree. Thus, the entry in the DNR table for a particular domain name could be just an address for another DNR. The packet would then be sent to another DNR, and the second DNR that would then use the domain name to find the final (or next) local address to the destination or another DNR, etc. The DNR table can be set up manually by the administrator for the network or may be set up automatically through embedded software, firmware or hardware.

In step 514, the DNR determines whether a record for the domain name was found. If no record was found, then an error message is sent back to host 150 in step 516. If a record is found, the global address for DNR 138 in the IP packet is replaced with the local address in the table. In step 520, the checksum for the IP header is adjusted if necessary. Since the destination IP address has changed in the header, the checksum may need to be adjusted accordingly. If the application incorporates information used by the IP packet into its data payload, such application packets may need to be adjusted as a result of the change in destination IP address.

When a packet is received by a host, the Network Layer passes the source and destination domain names to the Transport Layer (at least once for each connection). The Transport Layer may pass the source and destination domain names to the Application Layer. Any of the layers can use the source's domain name to send a reply.

Although FIG. 5 shows DNR 138 connected to and located between the LAN and the Internet, DNR 138 could also be located inside the LAN. The present invention can be used with network paradigms other than the TCP/IP reference model and/or the Internet.

The foregoing detailed description of the invention has been presented for purposes of illustration and description. It is not intended to be exhaustive or to limit the invention to the precise form disclosed, and obviously many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A method for communicating with entities in a private network, comprising the steps of:

initiating communication with a first entity, said communication is initiated from outside said private network using a unique identifier, said unique identifier is not an IP address, said unique identifier is used below an application layer, said first entity is in said private network, said first entity is an addressable physical entity that does not have a globally unique address; and communicating messages toward said first entity that reach said first entity via an intermediate entity, said intermediate entity has a first global address.

2. A method according to claim 1, wherein:

said unique identifier includes a domain name.

3. A method according to claim 1, wherein:

said unique identifier includes a string.

4. A method according to claim 1, wherein:

said unique identifier includes information representing said domain name.

5. A method according to claim 1, wherein:

said step of initiating is performed using a source entity and said intermediate entity.

6. A method according to claim 1, wherein said step of initiating includes the step of:

identifying said first entity using said unique identifier.

7. A method according to claim 1, wherein said step of initiating includes the step of:

requesting an identification of said first entity using said unique identifier.

8. A method according to claim 1, wherein:

said unique identifier is used at a network layer.

9. A method according to claim 1, wherein:

said unique identifier is used at a transport layer.

10. A method according to claim 1, further including the steps of:

receiving a particular message at said intermediate entity, said particular message includes said unique identifier and said first global address;

determining a local address for said first entity based on said unique identifier; and sending said particular message to said first entity based on said local address.

11. A method according to claim 10, wherein:

said unique identifier includes a domain name; and said domain name is used at a network layer.

12. One or more processor readable storage devices having processor readable code embodied on said processor readable storage devices, said processor readable code for programming a processor to perform a method for communicating with entities in a private network, said method comprising the steps of;

initiating communication with a first entity, said communication is initiated from outside said private network using a unique identifier, said unique identifier is not an IP address, said unique identifier is used below an application layer, said first entity is in said private network, said first entity is an addressable physical entity that does not have a globally unique address; and communicating messages toward said first entity that reach said first entity via an intermediate entity, said intermediate entity has a first global address.

13. One or more processor readable storage devices according to claim 12, wherein:

said unique identifier includes a domain name.

14. One or more processor readable storage devices according to claim 12, wherein:

said step of initiating is performed using a source entity and said intermediate entity.

15. One or more processor readable storage devices according to claim 12, wherein:

said unique identifier is used at a network layer.

16. One or more processor readable storage devices according to claim 12, wherein said method further comprises the steps of:

receiving a particular message at said intermediate entity, said particular message includes said unique identifier and said first global address of said intermediate entity, said first entity has a local address;

determining said local address based on said unique identifier; and sending said particular message to said first entity based on said local address.

17. A method for supporting communication, comprising the steps of:

receiving a message from a first entity, said message includes a unique identifier other than an IP address, said unique identifier identifies a second entity, said second entity does not have a globally unique IP address, said second entity is in a private network, said first entity is outside said private network;

using said unique identifier to access a local address that is not globally unique, said step of using is performed below an application layer, said local address corresponds to said second entity; and providing said local address in response to said message.

18. A method according to claim 17, wherein:

said unique identifier includes a domain name.

19. A method according to claim 17, wherein:

said unique identifier includes information representing said domain name.

20. A method according to claim 17, further comprising the step of:

facilitating communication between said first entity and said second entity using said local address.

21. A method according to claim 17, further comprising the step of: adding said local address to said message and sending said message to said second entity.

22. A method according to claim 21, wherein:

said unique identifier includes a domain name.

23. A method according to claim 17, wherein:

said step of using includes accessing a table that correlates unique identifiers to local addresses.

24. A method according to claim 17, wherein:

said received message includes a destination address; and said destination address corresponds to each entity in a set of entities, said set of entities includes said second entity and does not includes said first entity.

25. A method according to claim 24, further including the step of:

sending at least a portion of said message toward said second entity based on said local address.

26. A method according to claim 17, wherein:

said message is an initial communication between said first entity and said second entity.

27. A method according to claim 17, wherein:

said step of using is performed at a network layer.

28. One or more processor readable storage devices having processor readable code embodied on said processor readable storage devices, said processor readable code for programming a processor to perform a method comprising the steps of:

receiving a message from a first entity, said message includes a unique identifier other than an IP address, said unique identifier identifies a second entity, said second entity does not have a globally unique IP address, said second entity is in a private network, said first entity is outside said private network;

using said unique identifier to access a local address that is not globally unique, said unique identifier is used below an application layer, said local address corresponds to said second entity; and providing said local address in response to said message.

29. One or more processor readable storage devices according to claim 28, wherein:

said unique identifier includes a domain name.

30. One or more processor readable storage devices according to claim 28, further comprising the step of:

facilitating communication between said first entity and said second entity using said local address.

31. One or more processor readable storage devices according to claim 28, wherein:

said received message includes a destination address;

said destination address corresponds to each entity in a set of entities, said set of entities includes said second entity and does not includes said first entity; and said method further includes the step of sending at least a portion of said message toward said second entity based on said local address.

32. One or more processor readable storage devices according to claim 28, wherein:

said message is an initiation of communication between said first entity and said second entity.

33. One or more processor readable storage devices according to claim 28, wherein:

said step of using is performed at a network layer.

34. A method for communicating data, comprising the steps of:

receiving a data unit, said data unit includes a destination address and a first set of information separate from said destination address, said first set of information is not an IP address, said destination address corresponds to each entity in a set of entities, said first information corresponds to a subset of said set of entities, said subset of said entities includes a first entity; and sending said data unit toward said first entity, said step of sending includes addressing said data unit using said first information, said first information is used below an application layer.

35. A method according to claim 34, wherein:

said first information includes a domain name.

36. A method according to claim 34, wherein:

said first information includes information representing a domain name.

37. A method according to claim 34, wherein said step of sending includes:

using said first information to identify a local address, said step of sending includes sending said data unit using said local address, said local address corresponds to said first entity, said step of using said first information to identify a local address is performed below an application layer.

38. A method according to claim 37, wherein:

said first information includes a domain name.

39. A method according to claim 34, wherein said step of sending includes:

using said first information to identify a local address and editing said data unit to add said local address, said local address corresponds to said first entity, said step of using said first information to identify a local address is performed below an application layer.

40. A method according to claim 34, wherein:

said data unit is an initial communication between said a source entity and said first entity, said first entity is inside a private network, said first entity does not have a globally unique address, said source entity is outside said private network.

41. A method according to claim 40, wherein:

said first information is used at a network layer.

42. An apparatus used to communicate data, comprising:

a processor;

at least one network interface in communication with said processor; and a processor readable storage medium in communication with said processor, said processor readable storage medium storing code for programming said processor to perform a method comprising the steps of:

receiving a data unit, said data unit includes a destination address and a first set of information separate from said destination address, said first set of information is not an IP address, said destination address corresponds to each entity in a set of entities, said first information corresponds to a subset of said set of entities, said subset of said entities includes a first entity, and sending said data unit toward said first entity, said step of sending includes addressing said data unit using said first information, said first information is used below an application layer.

43. An apparatus according to claim 42, wherein:

said first information includes a domain name.

44. An apparatus according to claim 42, wherein said step of sending includes:

using said first information to identify a local address, said step of sending includes sending said data unit using said local address, said local address corresponds to said first entity, said step of using said first information to identify a local address is performed below an application layer.

45. An apparatus according to claim 42, wherein said step of sending includes:

using said first information to identify a local address and editing said data unit to add said local address, said local address corresponds to said first entity.

46. An apparatus according to claim 42, wherein:

said data unit is an initial communication between said a source entity and said first entity, said first entity is inside a private network, said first entity does not have a global address, said source entity is outside said private network.

47. An apparatus according to claim 42, wherein:

said first information is used at a network layer.

\* \* \* \* \*